United States Patent
Chang

(10) Patent No.: US 7,843,083 B2
(45) Date of Patent: Nov. 30, 2010

(54) BACKUP POWER SYSTEM EQUIPPED WITH INDEPENDENT PROTECTION CIRCUIT ARCHITECTURE

(75) Inventor: Yu-Yuan Chang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 135 days.

(21) Appl. No.: 12/032,320

(22) Filed: Feb. 15, 2008

(65) Prior Publication Data

US 2009/0206671 A1 Aug. 20, 2009

(51) Int. Cl.
*H02J 7/00* (2006.01)
*H02J 9/00* (2006.01)

(52) U.S. Cl. ........................................ 307/65
(58) Field of Classification Search .............. 307/64–66
See application file for complete search history.

(56) References Cited

U.S. PATENT DOCUMENTS 7,321,174 B2 * 1/2008 Jones et al. ................... 307/66

FOREIGN PATENT DOCUMENTS

TW            256758 B      6/2006
TW          200625865 A     7/2006

* cited by examiner

*Primary Examiner*—Jared J Fureman
*Assistant Examiner*—Carlos Amaya
(74) *Attorney, Agent, or Firm*—Muncy, Geissler, Olds & Lowe, PLLC

(57) ABSTRACT

The present invention includes plural power supplying units, a power distributing backplane and more than one protection circuits, wherein the power supplying unit produces an output power and the power distributing backplane integrates the output powers from plural power supplying units and distributes thereof into plural driving powers for supplying loads. The power circuit for the driving power to drive each load has a protection circuit mounted thereon, wherein the protection circuit detects a driving condition of the load or the power circuit, and according thereto, the protection circuit becomes open or close so as to disconnect or maintain the driving power. Therefore, the abnormal driving power will not influence the operation of the whole power system and other normal loads still can maintain operation. Furthermore, since plural power supplying units are used to provide the power needed by loads, the power capacity will not be wasted.

10 Claims, 3 Drawing Sheets

BACKUP POWER SYSTEM EQUIPPED WITH INDEPENDENT PROTECTION CIRCUIT ARCHITECTURE

FIELD OF THE INVENTION

The present invention is related to a backup power system equipped with independent protection circuit architecture, and more particularly to a power system used to produce multiple output powers for driving multiple loads.

BACKGROUND OF THE INVENTION

Usually, for preventing the electronic device from being influenced by power damage or outage so as to operate stably, a backup power system is used. The backup power system is constituted by more than one independent power supplies and a control circuit connected thereto in parallel for switching or distributing power so as to provide power needed by the load. An example is R.O.C. application serial No. 200625865, entitled "Device circuit equipped with backup power", wherein a backup power 805 is included. The backup power 805 includes two power sources 810, wherein only one of the two power sources 810 is used to supply power to the device, and the other power source 810 is used as a backup. This is a typical "1+1" redundant backup power system. In the "1+1" backup power system, multiple power sources are used to supply one operating system, and the backup power source is left unused when the operation is under normal operation without providing power thereto, so that the power resource of the backup power source is wasted. Furthermore, in the conventional backup power system, a protection circuit is also used to prevent the backup power system and the load connected thereto from being damaged by abnormal power, as disclosed in R.O.C. Patent No. I256758, entitled "Over-voltage protection circuit for power supply". As shown in FIG. 2A and FIG. 3A of this patent, the backup power system includes multiple power supplies and each power supply is equipped with an over-voltage protection circuit, so that when over voltage occurs, the power supplies will be closed for avoiding damage. However, if the backup power system drives multiple loads and only one thereof occurs over voltage, the over-voltage protection circuit will close all the power supplies, that is, other normal loads will be forced to close even though only one load is abnormal. Therefore, there is a need to improve the conventional backup power system and the protection circuit.

SUMMARY OF THE INVENTION

Consequently, the object of the present invention is to provide a circuit architecture including plural power supplying units, each of which can independently carry out a disconnection protection for particular load, so as to reduce power waste.

The present invention provides a backup power system equipped with independent protection circuit architecture including plural power supplying units, a power distributing backplane and more than one protection circuits, wherein the power supplying unit produces an output power and the power distributing backplane integrates the output powers from plural power supplying units and distributes thereof into plural driving powers for supplying loads. The power circuit for the driving power to drive each load has a protection circuit mounted thereon, wherein the protection circuit detects a driving condition of the load or the power circuit, and according thereto, the protection circuit becomes open or close so as to disconnect or maintain the driving power. Therefore, the abnormal driving power will not influence the operation of the whole power system and other normal loads still can maintain operation. Furthermore, since plural power supplying units are used to provide the power needed by loads, the power capacity will not be wasted.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
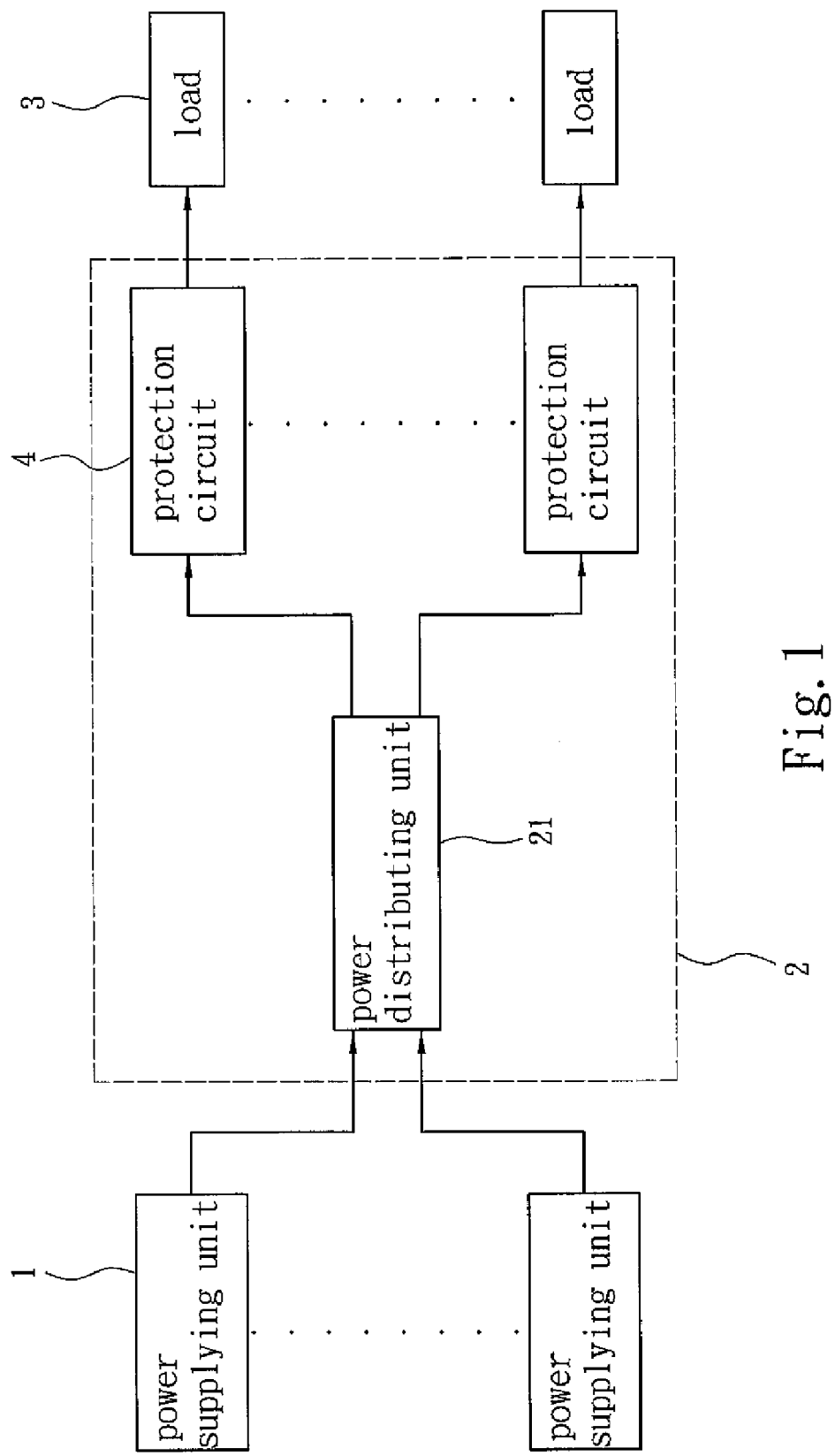
FIG. 1 shows the basic architecture of the present invention.

Please refer to FIG. 1, which is a block diagram showing the architecture of the present invention. A backup power system equipped with independent protection circuit architecture includes plural power supplying units 1 connected to a power distributing backplane 2 for providing multiple driving powers to drive more than one load 3, and the power distributing backplane 2 obtains plural output powers provided by plural power supplying units 1. The power distributing backplane 2 includes a power distributing unit 21 for integrating the output powers and then distributing thereof into plural driving powers according to the loads 3 linked thereto so as to supply each load 3. Moreover, on each power circuit for driving the load 3, an independent protection circuit 4 is mounted. The protection circuit 4 may detect the driving condition of the load 3 or the power circuit so as to become open or close according thereto, thereby disconnecting or maintaining the power supplying. When the protection circuit 4 decides that the driving power is abnormal (over current or over voltage), the protection circuit 4 becomes open so as to influence the electric connection between the load 3 and the power distributing backplane 2 by disconnecting or changing conductive impedance. Therefore, in addition to providing protection for the abnormal load 3, the power distributing backplane 2 and plural power supplying units 1, the plural power supplying units 1 and the power distributing backplane 1 still can maintain a normal operation for providing power to other loads 3.

Figure 2:
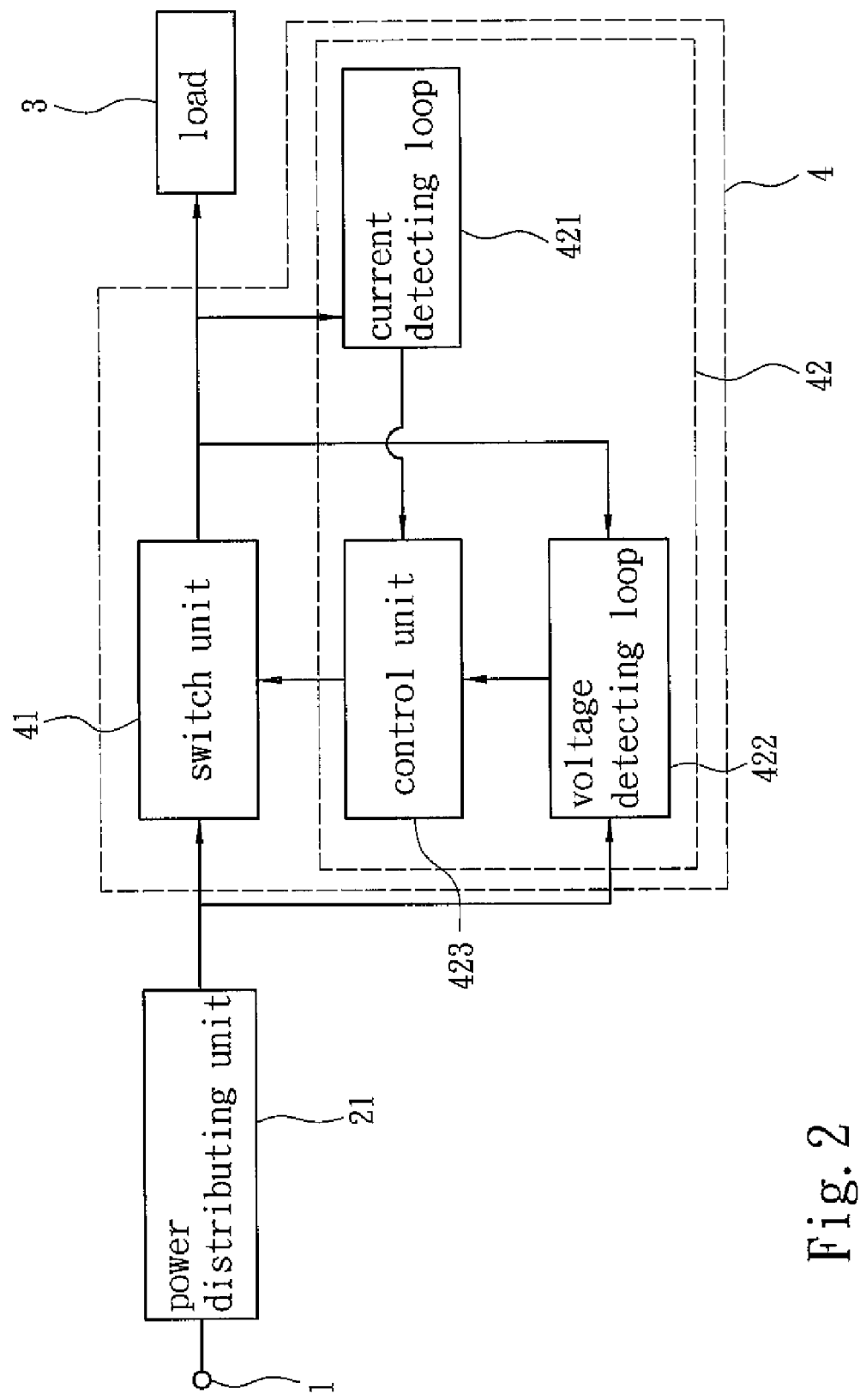
FIG. 2 shows the architecture of the protection circuit.
Figure 3:
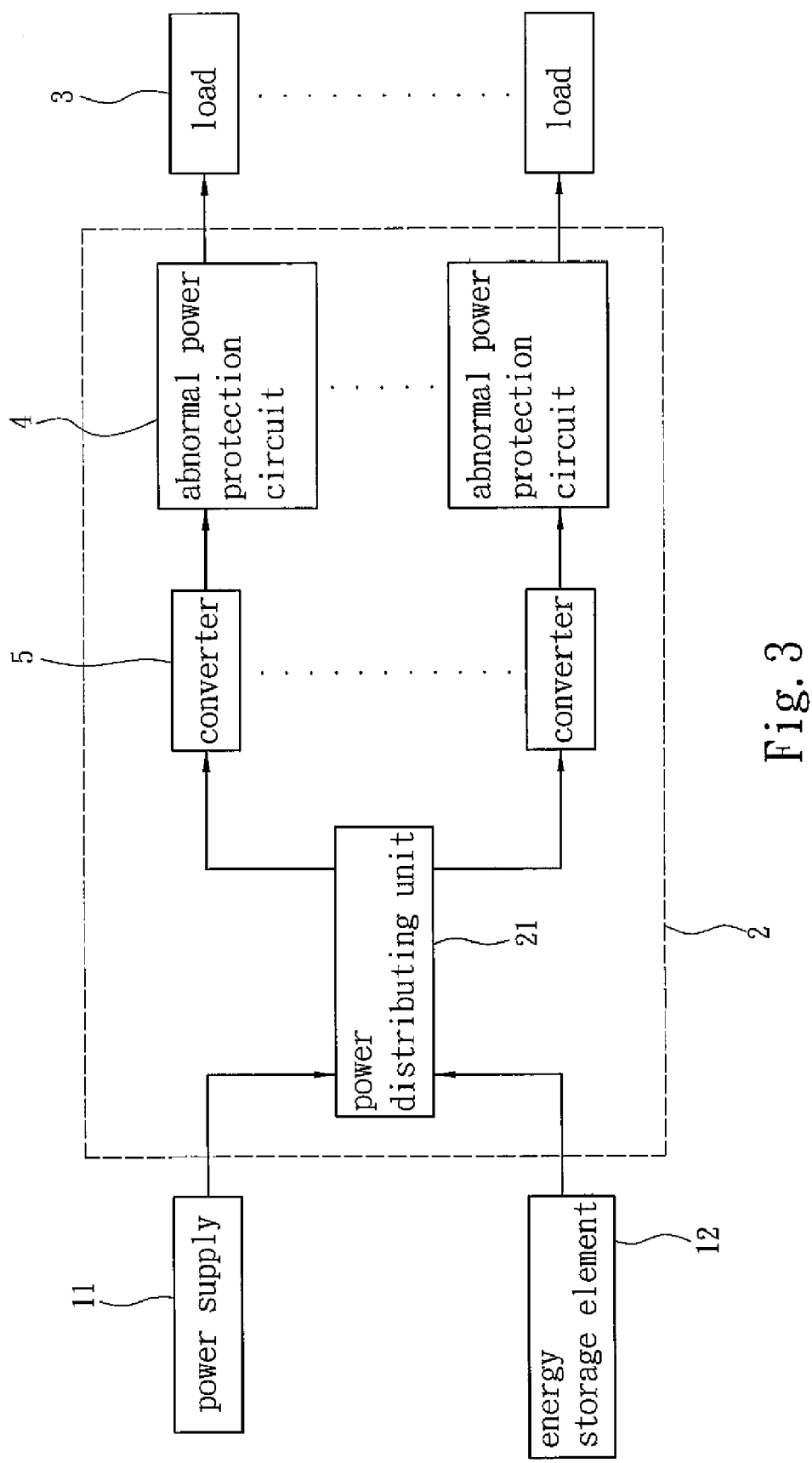
FIG. 3 shows an embodiment of the present invention.

Please refer to FIG. 2. The protection circuit 4 can be divided into a switch unit 41 and a protection judging unit 42, wherein the switch unit 41 is mounted on the power circuit for driving the load 3, and the protection judging unit 42 includes a voltage detecting loop 422 and a current detecting loop 421, which are connected to a control unit 423. The voltage detecting loop 422 and the current detecting loop 421 can produce a protection signal according to the condition of the driving power, so as to trigger the control unit 423 to generate a current-limiting signal to the switch unit 41. Therefore, according to the current-limiting signal, the switch unit 41 can drive the power disconnection or maintain the power supplying through becoming open or close, so as to influence the electric connection between the power distributing backplane 2 and the load 3, Please refer to FIG. 3. The protection circuit 4 is disposed on the power slotting backplane 2. Between the power distributing unit 21 and the protection circuit 4, a DC-DC converter 5 is mounted for converting the driving power into a power with particular voltage. The power supplying units 1 described above are connected to the power distributing backplane 2 in parallel, and the power supplying units 1 can be plural power supplies 11, or can be plural energy storage elements 12, or can be a combination of at least a power supply 11 and at least an energy storage element 12. According to the architecture described above, when one single load 3 becomes abnormal, it can independently disconnect the electric connection between the power distributing backplane 2 and the abnormal load 3 without influencing other normal loads, and further, since plural power supplying units 1 can provide power simultaneously, an extra standby backup power supplying unit 1 is no more needed.

Although the present invention is disclosed by the preferred embodiment described above, it is not for limitation. The power distributing unit 21, except for being mounted on the power distributing backplane 2, also can be integrated as a small circuit board for connecting to the power supplying unit 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A backup power system equipped with independent protection circuit architecture, comprising:
    plural power supplying units for providing plural output powers, each connected with one of a plurality of inputs of a power distributing backplane for integrating the plural output powers and distributing thereof into plural driving powers according to loads linked thereto at a plurality of outputs;
    a power circuit for each of the plural driving powers for driving a corresponding load;
    an individual protection circuit mounted in each power circuit for a corresponding load, wherein the protection circuit detects a driving condition of the corresponding load and the power circuit, and according thereto, the protection circuit becomes open or close so as to disconnect or maintain the driving power.

2. The backup power system as claimed in claim 1, wherein plural power supplying units are plural power supplies.

3. The backup power system as claimed in claim 1, wherein plural power supplying units are plural energy storage elements.

4. The backup power system as claimed in claim 1, wherein plural power supplying units are combination of at least a power supply and at least an energy storage element.

5. The backup power system as claimed in claim 1, wherein plural power supplying units are connected with the power distributing backplane in parallel.

6. The backup power system as claimed in claim 1, wherein the power distributing backplane comprises a power distributing unit for distributing the output powers from plural power supplying units.

7. The backup power system as claimed in claim 6, wherein the power distributing unit is connected with at least a converter for converting the voltage of the driving powers.

8. The backup power system as claimed in claim 1, wherein each protection circuit is mounted on the power distributing backplane.

9. The backup power system as claimed in claim 1, wherein each protection circuit comprises a protection judging unit for detecting the driving powers and a switch unit for conducting the driving powers, wherein the protection judging unit comprises a control unit, a voltage detecting loop and a current detecting loop, the voltage detecting loop and the current detecting loop detect the driving powers and judge the conditions of the driving powers for producing a protection signal, so as to trigger the control unit to generate a current limiting signal to the switch unit, and the switch unit becomes open or close according to the current limiting signal so as to disconnect or maintain the driving power.

10. The backup power system as claimed in claim 9, wherein each protection circuit is mounted on the power distributing backplane.

\* \* \* \* \*